Sept. 11, 1956  R. E. HENNING  2,762,972
AUTOMATIC IMPEDANCE MEASURING DEVICE
Filed March 9, 1953
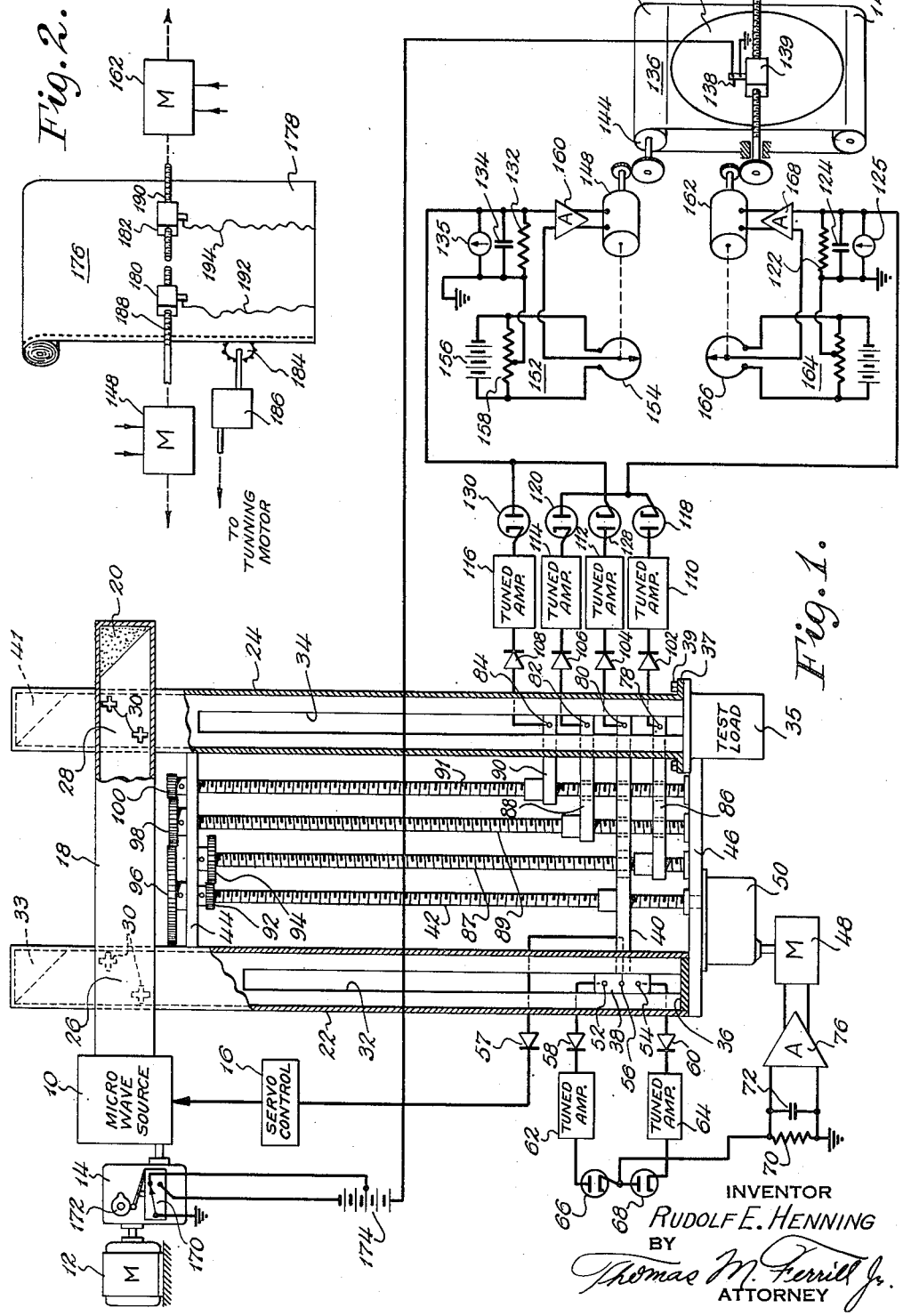
INVENTOR
RUDOLF E. HENNING
BY
Thomas M. Ferrill Jr.
ATTORNEY

United States Patent Office 2,762,972
Patented Sept. 11, 1956

2,762,972

AUTOMATIC IMPEDANCE MEASURING DEVICE

Rudolf E. Henning, New York, N. Y., assignor to Sperry Rand Corporation, a corporation of Delaware Application March 9, 1953, Serial No. 341,027

17 Claims. (Cl. 324—58)

This invention relates to measuring apparatus useful in the microwave region of the frequency spectrum, and more particularly, is concerned with means for rapidly and automatically measuring the reflection coefficient or impedance of a microwave load as a function of frequency.

The method in general use for making impedance measurements in the microwave region is to utilize a slotted section of transmission line for investigating standing waves along the line by means of a probe movable along the slot. Information which can be obtained from the probe includes the positions of the nodal points and the ratio of maximum to minimum voltage along the line. From this information, it is possible to compute the normalized impedance in terms of the reflection coefficient at any point along the line looking toward the load. To obtain a plot of impedance at a function of input frequency, it is necessary that a series of point-by-point computations be made, so that this method of investigating the impedance characteristics of a load as a function of frequency is a slow and tedious process.

Some attempts have been made heretofore to make measurements of impedance by means of fixed probes spaced along the transmission line such as that disclosed in the copending application Serial No. 293,698, filed June 14, 1952, now Patent No. 2,680,837. Another method is disclosed in Patent No. 2,605,323 to A. L. Samuel. In the Samuel method, four fixed probes equally spaced at intervals of one-eighth wavelength along the line sample the waves existing in the transmission line that connects the test load to a microwave source. These probes are connected in pairs, the two probes of each pair being spaced along the line by a quarter wavelength. The output of each probe is connected to a square-law detector, such as a crystal diode, and the difference in potential between the detector signals from one pair of probes, i. e., the first and third probes in the order of position from the load, is applied across the vertical deflection plates of a cathode ray oscilloscope, while the difference in potential between the detector signals from the remaining pair of probes, i. e., the second and fourth probes in the order of their position from the load, is applied across the horizontal deflection plates of the oscilloscope.

Samuel teaches that the polar coordinates of the resulting spot on the screen of the oscilloscope at any one frequency correspond to the magnitude and phase angle of the reflection coefficient of the load at that frequency at a plane of reference a distance of one-eighth wavelength from the first probe. He further teaches that if the input to the line is varied in frequency over a limited range, the oscilloscope spot traces out a path representing the desired curve on the reflection coefficient plane, giving a continuous polar coordinate plot of the reflection coefficient of the test load as it varies with frequency.

While such a system provides a rapid method of indicating the change of impedance with frequency, in practice it is not sufficiently accurate to provide a quantitative measurement of impedance except over an extremely limited bandwidth of operation. The fixed spacing of the probes makes the system critical as to frequency so that even over a 10% bandwidth of operation described as the useful frequency range of the system, the Samuel method of measuring impedance is of little value other than as a qualitative check of the change in impedance with frequency.

It is the general object of this invention to avoid and overcome the foregoing and other difficulties of and objections to the prior art practices by the provision of apparatus for measuring impedance in the ultra-high-frequency region which is automatic, rapid, accurate, and is operable continuously over a broad frequency band.

Another object of this invention is to provide means for producing a visual indication of the reflection coefficient of a test load as a function of frequency over a 40% frequency band without the necessity of re-tuning, and with an accuracy such that at any given frequency within the band the impedance points in the reflection coefficient plane are located within a circle having the true impedance point at its center and having a diameter of the order of 0.05 times the radius of the unit circle, which is the radius corresponding to the maximum amplitude of the reflection coefficient such as produced by a short circuit termination.

These and other objects of the invention which will become apparent as the description proceeds are achieved by the provision of apparatus comprising a variable frequency microwave energy source, the output frequency of which may be varied at a linear rate over the operating frequency range. A main wave guide terminated in an energy-absorbing non-reflecting impedance is coupled to the output of the microwave source. First and second auxiliary slotted wave guide sections are connected in parallel positional relationship, directional coupling means being provided to couple the incident energy in the main wave guide to the auxiliary wave guide sections. The first auixiliary wave guide section is terminated in a short circuit. The second auxiliary wave guide section is terminated with the test load.

Means including a pair of spaced probes extending through the slot in the first auxiliary wave guide detect variations in the electric field along the wave guide section. Servo means responsive to the difference in potential of the two probes moves the probe means in response to the difference in potential of the two probes so as to maintain the probe means at a point along the line where the probes are at equal potential, whereby the distance of the probe means from the short-circuited end is maintained proportional to the guide wavelength. Four movable probes extending through the slot in the second auxiliary wave guide section are linked together by means for moving each of the probes along the slot and for maintaining equal spacing among the probes. The means for moving each of the probes is actuated by movement of the probe means along the first auxiliary wave guide section, whereby the spacing between the four probes varies (with movement of the probe means along the first wave guide section) in direct proportion to the guide wavelength of the microwave energy, the spacing among the four probes being maintained at an eighth wavelength or odd multiple thereof over the entire frequency range. The differences in the detected voltage between the first and third probes and between the second and fourth probes are indicated, recorded, or preferably plotted in rectangular coordinates to provide information of the reflection coefficient of the test load.

For a better understanding of the invention, reference should be had to the accompanying drawing wherein:

Fig. 1 is a schematic diagram showing a preferred embodiment of the present invention; and Fig. 2 shows an alternative means of recording the impedance information.

In the drawing, the numeral 10 indicates generally a variable frequency microwave energy source which includes a tunable klystron or other high frequency generator. The microwave source 10 is mechanically tuned over a frequency range, for example, of the order of 4000 to 6000 megacycles, by any suitable drive means, such as a motor 12 and a speed-reduction gear drive 14. The mechanical tuning system of the source 10 is preferably designed to provide a substantially linear change in frequency throughout the frequency range of the microwave source.

The microwave source 10 is preferably of a servo-regulated type as described in the copending application S. N. 256,886 filed November 17, 1951 in the name of Seymour B. Cohn. The type of microwave source there described has a pulse modulated microwave output signal in which the fundamental harmonic content of the pulse modulation signal is maintained substantially contant by a servo control circuit, indicated at 16 in the drawing, which varies the modulation pulse width in response to any detected variations in the amplitude of the fundamental harmonic.

The pulse modulated output signal of the microwave source 10 is coupled to a hollow wave guide section 18 which ends in a suitable non-reflecting termination 20. A pair of auxiliary wave guide sections 22 and 24 are coupled to the main wave guide section 18 by cross-guide directional coupler means 26 and 28 respectively. Suitable cross-guide couplers are described in Patent No. 2,602,859 to T. Moreno. Each coupler includes a pair of cross-shaped apertures 30 positioned along a diagonal in the common wall portion between the main wave guide and auxiliary wave guide section, as shown in the drawing.

Both of the auxiliary wave guide sections 22 and 24 include slotted line portions, the slots being indicated at 32 and 34 respectively. The first auxiliary wave guide section 22 is terminated in a short circuit provided by a conducting plate 36, the short-circuiting termination producing standing waves along the first auxiliary wave guide section 22. The reflected energy is absorbed by a non-reflecting termination 33 at the other end of the auxiliary wave guide section 22 opposite the short-circuiting plate 36. The second auxiliary wave guide section 24 is terminated in a test load, indicated at 35, which is coupled to the end of the wave guide section 24 by means of a flange 37 to which the test load is secured, as by bolts 39. The energy reflected by the test load is absorbed by a non-reflecting termination 41 at the opposite end of the wave guide section 24.

To obtain information as to the wavelength of energy in the wave guide section 22, a servo operated probe system is provided which includes a probe carriage 38 movable along the slot 32. The probe carriage 38 is supported for movement along the slot 32 by means of a supporting arm 40 which threadedly engages a screw-feed shaft 42, the shaft being journalled at its ends in suitable bearing plates 44 and 46 rigidly supported between the auxiliary wave guide sections 22 and 24. Movement of the probe carriage 38 is effected by means of a servo motor 48 which drives the shaft 42 through a suitable speed reducer 50.

Supported in spaced relationship by the carriage 38 are a pair of probes 52 and 54 which extend into the interior of the wave guide section 22. For best operation of the servo probe system, the space between the probes should be of the order of a quarter wavelength as measured at the mid-band frequency of the operating frequency range. A third probe 56 is supported by the probe carriage 38 half-way between the probes 52 and 54, voltage at the probe 56 being coupled to the servo control 16 through a suitable detector 57 to provide the necessary signal indicative of variations in the amplitude of the fundamental harmonic of the pulse modulation signal required for regulating the source 10. The center probe 56 is normally positioned at the first voltage maximum, a quarter wavelength from the short-circuiting plate 36.

To maintain the center of the probe carriage 38 at a distance of a quarter wavelength from the short-circuiting plate 36 as the microwave source 10 sweeps through the entire frequency range, the probes 52 and 54 are connected through crystal diode detectors 58 and 60 to respective tuned audio amplifiers 62 and 64. The latter are tuned to the pulse modulation frequency of the modulated microwave signal. A pair of diode rectifiers 66 and 68 connect the output signals of the amplifiers 62 and 64 across a filter network including a resistor 70 and capacitor 72. The rectifiers are connecting in opposing relationship so as to conduct current through the resistor 70 in opposite directions. The opposed rectifiers thereby produce a D.-C. voltage across the resistor 70 which is proportional to the difference in amplitude of the output signals from the amplifiers 62 and 64.

It will be evident that the polarity of the D.-C. voltage produced across the resistor 70 reverses as the amplitudes of the respective signals detected by the probes 52 and 54 pass through a condition of equal amplitudes. If the probe carriage 38 is centered at a voltage maximum in the standing waves along the line 22, the probes 52 and 54, being symmetrically positioned about the maximum, detect signals of equal amplitudes, and the resulting potential across the resistor 70 is zero. As the frequency changes and the standing wave pattern shifts along the line, there is a momentary increase of signal strength at one of the probes and a decrease of signal strength at the other probe, producing a momentary D.-C. error voltage across the resistor 70.

The armature (not shown) of the separately-excited-field-type motor 48 is connected to the output circuit of a D.-C. power amplifier 76 which receives its input voltage across the resistor 70, the direction of rotation of the motor 48 being thus controlled in response to the polarity of the D.-C. potential across the resistor 70. Rotation of the motor 48 in response to the error voltage across the resistor 70 results in a repositioning of the probe carriage 38 in a direction to minimize the error voltage and thus maintain the probe carriage at the voltage maximum in the standing waves. Thus, the probe carriage is made to track the voltage maximum as it moves along the line with changing frequency.

Although a zero difference signal between the probes occurs when the carriage 38 is positioned symmetrically with respect to either a voltage maximum or minimum, at only one of these points, namely a voltage maximum, is the servo operated probe system in a stable balanced condition, as determined by the direction of rotation of the motor with a given polarity of voltage across the resistor 70. It will be seen from the above description that the distance of the center of the probe carriage 38 from the short-circuiting plate 36 is maintained proportional to the guide wavelength through the entire frequency range of the microwave signal.

To measure the reflection coefficient of the test load 35, four probes, indicated at 78, 80, 82, and 84 are positioned along the slot 34 of the auxiliary wave guide section 24. The probe 80 is supported for movement along the slot 34 by means of an extension of the supporting arm 40 and is maintained a quarter wavelength away from the junction of the test load and the end of the auxiliary waveguide section 34 with movement of the supporting arm 40 by the servo operated probe system above described. The end of the auxiliary wave guide section 24 is preferably in the same plane as the short-circuiting termination 36.

The probe 78 is supported for movement along the slot 34 by means of a supporting arm 86 which threadedly engages a screw-feed shaft 87, the shaft being journalled at its ends in the bearing plates 44 and 46. Similarly, the probe 82 is supported for movement along the slot 34 by means of a supporting arm 88 which threadedly engages a screw-feed shaft 89, and the probe 84 is supported by means of a supporting arm 90 which threadedly engages a screw-feed shaft 91. The probes are maintained in spaced relationship at equal intervals of an eighth wavelength by gearing each of the shafts 87, 89, and 91 to the shaft 42. Spur gears 92 and 94 rotate the shaft 87 one revolution for each two revolutions of the shaft 42, while spur gears 96, 98, and 100 rotate the shafts 89 and 91 from the shaft 42 at one and one-half revolutions and two revolutions respectively for each revolution of the shaft 42. Thus, it will be seen, assuming an equal screw pitch on each of the shafts 42, 87, 89, and 91, that the four probes along the slot 34 are maintained at equal spacing of an eighth wavelength over the entire frequency range of the microwave source 10 by the servo operated probe system in the auxiliary wave guide section 22.

Suitable square-law detectors, such as crystal diodes or barretter wires, indicated at 102, 104, 106, and 108, couple the probes 78, 80, 82, and 84 to tuned audio amplifiers 110, 112, 114, and 116 respectively, the amplifiers being tuned to the modulation frequency of the microwave energy. Alternate amplifiers 110 and 114 are connected by opposed rectifiers 118 and 120 to a filter network including a resistor 122 and capacitor 124, the voltage across the filter network being proportional to the difference in signal strength at the output of the respective detectors 102 and 106. A zero centered D.-C. voltmeter 125 indicates the variations in potential across the resistor 122. Similarly, the outputs of the amplifiers 112 and 116 are connected through opposed rectifiers 128 and 130 across a filter network including a resistor 132 and capacitor 134. The voltage appearing across the filter network 132, 134, which is proportional to the difference in signal strengths at the output of the respective detectors 104 and 108, is indicated on a second zero centered D.-C. voltmeter 135.

The reflection coefficient $\bar{\rho}$ of the load 35, which is a complex quantity, may be represented in the form $$\bar{\rho} = \rho_{real} + \rho_{im}$$

If the probes are spaced at eighth wavelength intervals along the guide from the test load, the difference in potential between the square of the voltages at the first and third probes in their orders from the test load is proportional to the imaginary component $\rho_{im}$ of the reflection coefficient. The difference in potential between the square of the voltages at the second and fourth probes in turn is proportional to the real component $\rho_{real}$ of the reflection coefficient. Once the voltmeters 125 and 135 are calibrated they indicate directly the real and imaginary components of the reflection coefficient of the test load at the frequency of the microwave signal at that instant. The frequency sweep of the source must be made quite slow, or the frequency manually changed in steps, however, to take advantage of the voltmeters in getting a quantitative measure of the reflection coefficient or impedance of the load as a function of frequency.

A more convenient method of presenting the measured reflection coefficient information is to plot the real and imaginary components of the reflection coefficient in rectangular coordinates. This may be accomplished by suitable rectangular coordinate plotting means as indicated at 136 in Fig. 1. Plotting means 136 includes a heated tracing element 138 which is supported by a laterally moving supporting member 139. The tracing element 138 is in contact with the surface of a chart 140, the chart being coated or impregnated with a material that produces a stain when heated, whereby the heated tracing element 138 produces a continuous line on the chart along the path of movement of the tracing element 138. Such thermally sensitive chart papers are well known and commercially available. However, any suitable recording medium may be used, such as a recording pen and ink.

The chart 140 is mounted on a movable belt 142 which extends between rotatable rollers 144 and 146. It will be seen that rotation of the rollers effects movement of the chart 140 along one coordinate relative to the tracing element 138. Rotation of the roller 144 is provided by a servomotor 148 suitably geared to the shaft of the roller 144.

To effect relative movement between the tracing element 138 and the chart 140 along the one coordinate in response to the real component of the reflection coefficient of the test load 35, the angular position of the servomotor 148 is controlled in response to the variations in voltage across the resistor 132. This is accomplished by comparing the voltage across the resistor 132 with the voltage across a bridge circuit 152, which includes a potentiometer 154 connected across a D.-C. potential source 156 and mechanically coupled to the servomotor 148 for rotation of the sliding contact. The difference in potential across the resistor 132 and across the bridge circuit 152, as measured between the sliding contact of the potentiometer 154 and the center point of the shunt resistor 158, is amplified by a suitable D.-C. amplifier 160 and applied to the servomotor 148. Rotation of the servomotor 148 in response to the output signal from the amplifier 160 rotates the sliding contact of the potentiometer 154 until the input signal to the amplifier 160 is reduced to zero. Thus, the angular position of the output shaft of the servomotor 148 is maintained proportional to the voltage across the resistor 132, the position of the tracing element 138 relative to the chart 140 along one coordinate being thereby maintained proportional to the voltage across resistor 132.

Movement of the tracing element 138 relative to the chart 140 in the other rectangular coordinate is similarly controlled in response to the imaginary component of the reflection coefficient as indicated by the voltage across the resistor 122. This is accomplished by means of a servomotor 162 which is geared to a screw-feed shaft 164 that threadedly engages the supporting member 139. The angular position of the output shaft of the servomotor 162 is maintained proportional to the voltage across the resistor 122 by comparing that voltage with the voltage across the bridge circuit 164. The latter circuit includes a potentiometer 166 mechanically coupled to the servomotor 162. Any difference in voltage across the resistor 122 and the bridge circuit 164 is amplified by a suitable D.-C. amplifier 168 and applied to the servomotor 162. Rotation of the potentiometer 166 is thereby effected so as to reduce the input to the amplifier 168 to zero and thereby maintain the position of the tracing element 138 relative to the chart 140 along the other coordinate proportional to the voltage across the resistor 122.

The drive connections to potentiometers 154 and 166 are indicated schematically; each of these connections is in practice arranged to retain the potentiometer arm within its normal range of angular movement for full-range operation of the recorder system.

The resulting trace on the chart 140 is a plot of the reflection coefficient of the test load, as it varies with frequency, in the reflection coefficient plane, the polar coordinates of any given point along the trace representing the amplitude and phase of the reflection coefficient of the test load 35 at the corresponding frequency. The center point of the rectangular coordinate plot and the origin of the polar coordinate plot of the reflection coefficient, which corresponds to a load impedance that is matched to the line and produces zero reflection, can be established on the chart 140 by interrupting the output of the source 10. The maximum amplitude of the reflection coefficient vector is unity, the unit circle on the chart 140 being determined by substituting a short circuit termination for the test load 35. The unit circle establishes a scale factor from which absolute values of the reflection coefficient can be determined. To obtain impedance information directly, a printed Smith chart (described in Electronics, January 1939, in the article "Transmission Line Calculation" by P. H. Smith) may be used as the chart 140, the trace of the reflection coefficient on the Smith chart being read off directly in terms of the normalized resistances and reactances of the test load 35.

As the variation in amplitude and phase of the reflection coefficient of the load is continuously recorded on the chart 140, it is desirable that some frequency reference be superimposed on the chart so that measurements can be interpreted in terms of the instantaneous frequency of the energy transmitted to the load under test. One way of accomplishing this quite simply is to provide a switch 170 which is mechanically actuated by the frequency tuning means of the microwave source 10. The switch 170 may be actuated by a cam 172 driven from the speed reducer 14. The switch normally connects a small heating current from across a portion of a voltage source 174 through the tracing element 138 to produce a light trace on the thermally sensitive chart paper, but when momentarily actuated by the cam 172, connects the tracing element 138 across the full voltage of the source 174. Reversing of the switch 170 thereby produces increased heating of the tracing element 138, resulting in a momentary increase in the density and area of the trace on the chart paper. These spots in the trace occur at periodic fixed frequency intervals, such as every 50 or 100 megacycles change in frequency, as the motor 12 changes the output frequency of the source 10 through the range. Thus, a series of spots are superimposed along the trace on the chart which can be correlated to the changing microwave frequency.

An alternative means of recording the changes in load impedance with frequency is illustrated in Fig. 2 and includes a continuous strip recorder indicated generally at 176. A paper strip 178 is fed past a pair of recording elements 180 and 182 by mechanically driving the strip by means of a sprocket wheel 184 rotated by the tuning motor 12 through a suitable speed reducer 186. The recording elements are moved laterally across the strip in response to the real and imaginary components of the reflection coefficient of the load as indicated by the voltages across the resistors 122 and 132 (Fig. 1) respectively. This is accomplished by actuating the tracing elements 180 and 182 by means of the above-identified servomotors 148 and 162, as by means of screw-feed shafts 188 and 190 that threadedly engage tracing elements 180 and 182 respectively.

The strip recorder 176 provides a pair of line traces, indicated at 192 and 194, which indicate variations in the real and imaginary components of the reflection coefficient as a function of the changing frequency of the microwave source. This form of recorder information has the advantage that the frequency scale is stretched out and linear whereas in the rectangular coordinate plot of the components of the reflection coefficient, the spacing of the frequency reference spots is not linear.

To obtain accurate results with the apparatus above-described, care must be exercised in matching the detectors 102, 104, 106, and 108 so they have the same sensitivity and follow the same law with changes in signal strength. The detector 57 also must be matched to these four detectors so that the control of the microwave energy over the frequency range will be consistent. The amplifiers 110, 112, 114, and 116 must be matched in gain. Probes must be used that give broadband performance, and must not be so large as to distort the fields in the slotted wave guide sections. Other factors in design will be apparent to one skilled in the art as requiring care in selection of components to minimize measurement errors.

From the above description it will be recognized that the objects of the invention have been achieved by the provision of microwave impedance measuring equipment utilizing the method in which probes spaced along the transmission line to the test load provide information plotted as a trace or traces indicative of the variation in amplitude and phase of the reflection coefficient of the load with changing frequency. The spacing of the probes is adjusted to maintain a spacing of an eighth wavelength by servo means responsive to changes in guide wavelength, resulting in a more accurate impedance measuring apparatus and one which is operable over a greatly expanded frequency scale. Since the spacing between the sampling probes is adjusted with wavelength, the intervals between the probes need not be restricted to an eighth wavelength, as is necessary with fixed sampling probes to obtain maximum bandwidth of operation, but may be spaced at intervals of any odd multiple of an eighth wavelength. (It should be noted, however, that with spacings at multiples of 3, 7, 11, . . . of an eighth wavelength, the connections of the probes 78 and 82 with the amplifiers 110 and 114 should be interchanged, so that the probe 78 would be connected to the amplifier 114 and the probe 82 would be connected to the amplifier 110 in the diagram of the figure.) Larger spacing between the probes is desirable where the wavelength becomes so short as to make it mechanically impractical to space the probes at an eighth wavelength.

It should be noted that the invention contemplates what amounts in effect to a vector summation of the squared output signals from the square-law detectors, where the vector representations of the output signals have lengths proportional to the magnitudes of the respective output signals, and the vectors are spaced at intervals of 90°, i. e., 360° divided by the number of probes. Taking the difference between the detector outputs from alternate probes, therefore may equally as well be considered as taking the sum of two vector quantities at 180° relative to each other. The final resultant then is obtained by taking the resultant of this vector sum and the resultant of the vector sum of the outputs of the other pair of alternate probes and adding them vectorially as two vectors at 90° relative to each other.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Apparatus for measuring the impedance of a microwave test load, said apparatus comprising a variable frequency microwave energy source, means for varying the signal frequency of the source over the operating frequency range at a substantially linear rate, a main wave guide coupled to the output of the microwave source and terminated in an energy-absorbing non-reflecting impedance, first and second auxiliary wave guide sections substantially parallel to each other and having longitudinal slots therein, directional coupler means for coupling incident energy in the main wave guide into each of the auxiliary wave guide sections, the first auxiliary wave guide section being terminated in a short circuit and the second auxiliary wave guide section being terminated in the test load, means including a pair of spaced probes extending through the slot in the first auxiliary wave guide section for detecting variations in the electric field along the wave guide section, motor means mechanically coupled to the probe means for imparting movement thereto along the slot in the first auxiliary wave guide section, servo control means responsive to the difference in potential of the two probes for actuating the motor means to position the probe means at a point where the probes are at equal potential, whereby the distance of the probe means from the short-circuited end of the first auxiliary wave guide section is maintained proportional to the guide wavelength, four movable probes extending through the slot in the second auxiliary wave guide section, means for moving each of the probes along the slot, means for maintaining equal spacings among the four probes and between the first probe and a fixed reference point along the wave guide adjacent the load, said means for moving each of the probes being actuated by the motor means whereby the spacing between any two successive probes along the second auxiliary wave guide section varies with movement of the probe means along the first auxiliary wave guide section, the four probes being spaced at intervals of an eighth wavelength or odd multiple thereof, means for rectifying the output signals from the four probes, means for amplifying each of the rectified signals, means for producing an output signal indicative of the difference in amplitude of the rectified amplified signals from the first and third probes, means for producing an output signal indicative of the difference in amplitude of the rectified amplified signals from the second and fourth probes, rectangular coordinate plotting means, and first and second servomotor means for controlling respectively the two coordinates of said plotting means, the first servomotor means being responsive to one of said difference signals and the second servomotor means being responsive to the other of said difference signals.

2. Apparatus for measuring the impedance of a microwave test load, said apparatus comprising a variable frequency microwave energy source, means for varying the signal frequency of the source over the operating frequency range at a substantially linear rate, a main wave guide coupled to the output of the microwave source and terminated in an energy-absorbing non-reflecting impedance, first and second auxiliary wave guide sections substantially parallel to each other and having longitudinal slots therein, directional coupler means for coupling incident energy in the main wave guide into each of the auxiliary wave guide sections, the first auxiliary wave guide section being terminated in a short circuit and the second auxiliary wave guide section being terminated in the test load, means including a pair of spaced probes extending through the slot in the first auxiliary wave guide section for detecting variations in the electric field along the wave guide section, motor means mechanically coupled to the probe means for imparting movement thereto along the slot in the first auxiliary wave guide section, servo control means responsive to the difference in potential of the two probes for actuating the motor means to position the probe means at a point where the probes are at equal potential, whereby the distance of the probe means from the short-circuited end of the first auxiliary wave guide section is maintained proportional to the guide wavelength, four movable probes extending through the slot in the second auxiliary wave guide section, means for moving each of the probes along the slot, means for maintaining equal spacings among the four probes and between the first probe and a fixed reference point along the wave guide adjacent the load, said means for moving each of the probes being actuated by the motor means whereby the spacing between any two successive probes along the second auxiliary wave guide section varies with movement of the probe means along the first auxiliary wave guide section, the four probes being spaced at intervals of an eighth wavelength or odd multiple thereof, means for rectifying the output signals from the four probes, means for amplifying each of the rectified signals, means for producing an output signal indicative of the difference in amplitude of the rectified amplified signals from the first and third probes, means for producing an output signal indicative of the difference in amplitude of the rectified amplified signals from the second and fourth probes, and means for plotting variations in each of the difference signals as a function of time.

3. Apparatus for measuring the impedance of a microwave test load, said apparatus comprising a variable frequency microwave energy source, means for varying the signal frequency of the source over the operating frequency range at a substantially linear rate, a main wave guide coupled to the output of the microwave source and terminated in an energy-absorbing non-reflecting impedance, first and second auxiliary wave guide sections substantially parallel to each other and having longitudinal slots therein, directional coupler means for coupling incident energy in the main wave guide into each of the auxiliary wave guide sections, the first auxiliary wave guide section being terminated in a short circuit and the second auxiliary wave guide section being terminated in the test load, means including a pair of spaced probes extending through the slot in the first auxiliary wave guide section for detecting variations in the electric field along the wave guide section, motor means mechanically coupled to the probe means for imparting movement thereto along the slot in the first auxiliary wave guide section, servo control means responsive to the difference in potential of the two probes for actuating the motor means to position the probe means at a point where the probes are at equal potential, whereby the distance of the probe means from the short-circuited end of the first auxiliary wave guide section is maintained proportional to the guide wavelength, four movable probes extending through the slot in the second auxiliary wave guide section, means for moving each of the probes along the slot, means for maintaining equal spacings among the four probes and between the first probe and a fixed reference point along the wave guide adjacent the load, said means for moving each of the probes being actuated by the motor means whereby the spacing between any two successive probes along the second auxiliary wave guide section varies with movement of the probe means along the first auxiliary wave guide section, the four probes being spaced at intervals of an eighth wavelength or odd multiple thereof, means for rectifying the output signals from the four probes, means for amplifying each of the rectified signals, means for producing an output signal indicative of the difference in amplitude of the rectified amplified signals from the first and third probes, means for producing an output signal indicative of the difference in amplitude of the rectified amplified signals from the second and fourth probes, and means responsive to each of the difference signals, said means including means for indicating variations in amplitude of each of said difference signals.

4. Apparatus for measuring the impedance of a microwave test load, said apparatus comprising a variable frequency microwave energy source, means for varying the signal frequency of the source over the operating frequency range at a substantially linear rate, a main wave guide coupled to the output of the microwave stource and terminated in an energy-absorbing non-reflecting impedance, first and second auxiliary wave guide sections substantially parallel to each other and having longitudinal slots therein, directional coupler means for coupling incident energy in the main wave guide into each of the auxiliary wave guide sections, the first auxiliary wave guide section being terminated in a short circuit and the second auxiliary wave guide section being terminated in the test load, means including a pair of spaced probes extending through the slot in the first auxiliary wave guide section for detecting variations in the electric field along the wave guide section, motor means mechanically coupled to the probe means for imparting movement thereto along the slot in the first auxiliary wave guide section, servo control means responsive to the difference in potential of the two probes for actuating the motor means to position the probe means at a point where the probes are at equal potential, whereby the distance of the probe means from the short-circuited end of the first auxiliary wave guide section is maintained proportional to the guide wavelength, four movable probes extending through the slot in the second auxiliary wave guide section, means for moving each of the probes along the slot, means for maintaining equal spacing among the four probes and between the first probe and a fixed reference point along the wave guide adjacent the load, said means for moving each of the probes being actuated by the motor means whereby the spacing between any two successive probes along the second auxiliary wave guide section varies with movement of the probe means along the first auxiliary wave guide section, the four probes being spaced at intervals of an eighth wavelength or odd multiple thereof, detectors for rectifying the output signals from the four probes, and means responsive to the voltage difference between the output of the detectors coupled to the first and third probes and responsive to the voltage difference between the outputs of the detectors coupled to the second and fourth probes, said means including means for indicating variations in said voltage differences.

5. Apparatus for measuring the impedance of a microwave test load, said apparatus comprising a variable frequency microwave energy source, first and second wave guide sections having longitudinal slots therein, means for coupling incident energy from the energy source into each of the wave guide sections, the first wave guide section being terminated in a short circuit and the second wave guide section being terminated in the test load, means including a pair of spaced probes extending through the slot in the first wave guide section for detecting variations in the electric field along the wave guide section, motor means mechanically coupled to the probe means for imparting movement thereto along the slot in the first wave guide section, servo control means responsive to the difference in potential of the two probes for actuating the motor means to position the probe means at a point where the probes are at equal potential, whereby the distance of the probe means from the short-circuited end of the first wave guide section is maintained proportional to the guide wavelength, four movable probes extending through the slot in the second wave guide section, means for moving each of the probes along the slot, means for maintaining equal spacings among the four probes and between the first probe and a fixed reference point along the wave guide adjacent the load, said means for moving each of the probes being actuated by the motor means whereby the spacing between any two successive probes along the second wave guide section varies with movement of the probe means along the first wave guide section, the four probes being spaced at intervals of an eighth wavelength or odd multiple thereof, detectors for rectifying the output signals from the four probes and means responsive to the voltage difference between the outputs of the detectors coupled to the first and third probes and responsive to the voltage difference between the outputs of the detectors coupled to the second and fourth probes, said means including means for indicating variations in said voltage differences.

6. Apparatus as defined in claim 5 further including means for regulating the power output of the microwave energy source, a probe extending through the slot in the first wave guide section and positioned intermediate said pair of probes, said probe being movable with said probe means, and means for detecting the output signal at said probe, the output of the detecting means being coupled to said regulating means for controlling the output of the microwave source in response to variations in the output signal at said probe.

7. Apparatus for measuring the impedance of a microwave test load, said apparatus comprising a variable frequency microwave energy source, first and second wave guide sections having longitudinal slots therein, means for coupling incident energy from the energy source into each of the wave guide sections, the first wave guide section being terminated in a short circuit and the second wave guide section being terminated in the test load, probe means extending through the slot in the first wave guide section for detecting variations in the electric field along the wave guide section, motor means mechanically coupled to the probe means for imparting movement thereto along the slot in the first wave guide section, means electrically coupled to the probe means for controlling the motor means in response to changes in the standing wave pattern along the first wave guide section as detected by the probes, four movable probes extending through the slot in the second wave guide section, means for moving each of the probes along the slot, means for maintaining equal spacings among the four probes and between the first probe and a fixed reference point along the wave guide adjacent the load, said means for moving each of the probes being actuated by the motor means whereby the spacing between any two successive probes along the second wave guide section varies with movement of the probe means along the first wave guide section, the four probes being spaced at intervals of an eighth wavelength or odd multiple thereof, detectors for rectifying the output signal from each of the four probes, and means responsive to the voltage difference between the outputs of the detectors coupled to the first and third probes and responsive to the voltage difference between the outputs of the detectors coupled to the second and fourth probes, said means including means for indicating variations in said voltage differences.

8. Apparatus for measuring the impedance of a microwave test load, said apparatus comprising a variable frequency microwave energy source, first and second wave guide sections having longitudinal slots therein, means for coupling incident energy from the energy source into each of the wave guide sections, the first wave guide section being terminated in a short circuit and the second wave guide section being terminated in the test load, servo operated probe means associated with the first wave guide section, the probe means being automatically positioned along the first wave guide section in fixed relation to the detected standing wave pattern therealong, four movable probes extending through the slot in the second wave guide section, means for moving each of the probes along the slot, means for maintaining equal spacings among the four probes, said means for moving each of the probes being actuated by said servo operated probe means whereby the spacing between any two successive probes along the second wave guide section varies with movement of the probe means along the first wave guide section, the four probes being spaced at intervals of an eighth wavelength or odd multiple thereof, detectors for rectifying the output signals from each of the four probes, and means responsive to the voltage difference between the outputs of the detectors coupled to the first and third probes and responsive to the voltage difference between the outputs of the detectors coupled to the second and fourth probes, said means including means for indicating variations in said voltage differences.

9. Apparatus for measuring the impedance of a test load, said apparatus comprising a variable frequency microwave source, means including a section of slotted transmission line for coupling energy from the source to the test load, four movable probes positioned along the slotted line section, means for moving the probes along the slot, said means including linkage means for maintaining the ratios of distances between adjacent probes and the distance between any one probe and the test load constant with movement of the probes, means responsive to change in wavelength of the energy transmitted to the test load, means actuated by the wavelength responsive means for actuating the probe moving means with change in wavelength, the said distances between adjacent probes and any one of the probes and the test load being an eighth wavelength or odd multiple thereof, and means responsive to the difference in squares of the voltages at the first and third probes and responsive to the difference in the squares of the voltages at the second and fourth probes in their order from the test load, said last-named means including means for indicating variations in the respective differences.

10. Apparatus for measuring the impedance of a test load, said apparatus comprising a variable frequency microwave source, means including a section of slotted transmission line for coupling energy from the source to the test load, four movable probes positioned along the slotted line section, means for moving the probes along the slot, said means including linkage means for maintaining the ratios of distances between adjacent probes constant with movement of the probes, means responsive to change in wavelength of the energy transmitted to the test load, means actuated by the wavelength responsive means for actuating the probe moving means with change in wavelength, the said distances between adjacent probes being an eighth wavelength or odd multiple thereof, and means responsive to the difference in the squares of the voltages at the first and third of the probes and responsive to the difference in the squares of the voltages at the second and fourth of the probes in their order from the test load, said last-named means including means for indicating variations in the respective differences.

11. Apparatus for measuring the impedance of a microwave load, said apparatus comprising a source of microwave energy, means including a section of slotted line for coupling energy from the source to the load, four probes movable along the line and extending through the slot, means responsive to the wavelength of energy transmitted to the test load, means actuated by the wavelength responsive means for varying the spacings among the probes with changes in wavelength, the probes being spaced apart an eighth wavelength or odd multiple thereof, and means for indicating changes in the difference between the squares of the voltages at the first and third probes and at the second and fourth probes.

12. Apparatus for measuring the impedance of a microwave load, said apparatus comprising a source of microwave energy, means including a section of slotted line for coupling energy from the source to the load, a plurality of probes movable along the line and extending through the slot, means responsive to the wavelength of energy transmitted to the test load, means actuated by the wavelength responsive means for varying the spacings among the probes with changes in wavelength, the probes being spaced apart an eighth wavelength or odd multiple thereof, means for detecting the output signals at said probes, and means for indicating variations in the relative potential as detected at each of the probes.

13. Apparatus for measuring the impedance of a microwave load, said apparatus comprising a source of microwave energy, means including a section of slotted line for coupling energy from the source to the load, a plurality of probes movable along the line and extending through the slot, means responsive to the wavelength of energy transmitted to the test load, means actuated by the wavelength responsive means for varying the spacings among the probes with changes in wavelength, means for detecting the output signals at said probes, and means for indicating variations in the relative potential as detected at each of the probes.

14. Apparatus for providing a measure of the impedance of a microwave load, said apparatus comprising a variable frequency source of microwave energy, means including a longitudinally slotted transmission line for coupling energy from the source to the load, a series of $n$ number of movable probes spaced along the transmission line and each projecting into the longitudinal slot thereof, the number $n$ being greater than two, means for determining the wavelength $\lambda$ in the transmission line of the transmitted microwave energy, means responsive to said last-named means and varying the positions of the probes with variation in frequency of the source for maintaining the intervals between probes equal to $$\frac{m\lambda}{2n}$$

where $m$ is any odd integer, detector means coupled to each of the probes, and means responsive to the output signals of each of said detector means, said last-named means including means for combining the output signals from the detector means vectorially, where the angles between the vector representations of the output signals are $$\frac{360}{n}$$

degrees and the magnitudes are proportional to the amplitudes of the output signals.

15. Apparatus as defined in claim 14 wherein $n$ is equal to four and the probes are spaced at an eighth wavelength or odd multiple thereof.

16. Apparatus as defined in claim 15 wherein said means for combining the outputs vectorially comprises means for taking the difference between the output signals as detected at the first and third of the four probes and the difference between the second and fourth probes, the combining means presenting the resultant of the difference signals added vectorially in quadrature.

17. Apparatus for measuring the impedance of a microwave test load, said apparatus comprising a variable frequency microwave energy source, first and second wave guide sections having longitudinal slots therein, means for coupling incident energy from the energy source into each of the wave guide sections, the first wave guide section being terminated in a short circuit and the second wave guide section being terminated in the test load, servo operated probe means associated with the first wave guide section, the probe means being automatically positioned along the first wave guide section in fixed relation to the detected standing wave pattern therealong, a plurality of movable probes extending through the slot in the second wave guide section, means for moving each of the probes along the slot, means for maintaining equal spacings among the probes, said means for moving each of the probes being actuated by said servo operated probe means whereby the spacing between any two successive probes along the second wave guide section varies with movement of the probe means along the first wave guide section, and means for indicating variations in the relative potentials as detected at the probes.

References Cited in the file of this patent

FOREIGN PATENTS 937,524     France _____ Mar. 8, 1948